(12) United States Patent
Bonte et al.

(10) Patent No.: US 10,412,897 B2
(45) Date of Patent: Sep. 17, 2019

(54) SQUARE BALERS

(71) Applicant: CNH Industrial America LLC, New Holland, PA (US)

(72) Inventors: Xavier G. J. M. Bonte, Et Sint Kruis (NL); Stefan De Rycke, Olsene-Zulte (BE); Frederik Demon, Bruges (Sint-Kruis) (BE); Luigi Forghieri, Ghent (BE)

(73) Assignee: CNH Industrial America LLC, New Holland, PA (US)

( * ) Notice: Subject to any disclaimer, the term of this patent is extended or adjusted under 35 U.S.C. 154(b) by 312 days.

(21) Appl. No.: 15/501,132

(22) PCT Filed: Jul. 23, 2015

(86) PCT No.: PCT/EP2015/066816
§ 371 (c)(1),
(2) Date: Feb. 1, 2017

(87) PCT Pub. No.: WO2016/016071
PCT Pub. Date: Feb. 4, 2016

(65) Prior Publication Data
US 2017/0223899 A1    Aug. 10, 2017

(30) Foreign Application Priority Data
Aug. 1, 2014   (BE) .................................. 2014/0596

(51) Int. Cl.
*A01F 15/08*    (2006.01)
*A01F 15/04*    (2006.01)
(Continued)

(52) U.S. Cl.
CPC .......... *A01F 15/0825* (2013.01); *A01F 15/04* (2013.01); *A01F 15/145* (2013.01); *B30B 9/3003* (2013.01); *B30B 9/3032* (2013.01)

(58) Field of Classification Search
CPC .... A01F 15/04; A01F 15/145; A01F 15/0825; B30B 9/3032; B30B 9/3003
See application file for complete search history.

(56) References Cited

U.S. PATENT DOCUMENTS 2,724,324 A    11/1955   Clarke
2,844,092 A    7/1958    Davis
(Continued)

FOREIGN PATENT DOCUMENTS

DE    20206301 A1    12/1971
DE    10106094 A1    8/2002
(Continued)

*Primary Examiner* — Matthew Katcoff
(74) *Attorney, Agent, or Firm* — Peter K. Zacharias; Patrick M. Sheldrake

(57) ABSTRACT

A square baler including a baling chamber having a floor formed of spaced profiles, side walls and a top wall, and a density belt surrounding the baling chamber. The density belt is formed of a U-shaped frame having three beams welded to one another to define a floor beam for supporting the floor of the baling chamber and two upright beams for supporting the side walls of the baling chamber and a tensioning rod releasably secured to the upper ends of the two upright beams to prevent the upright beams from splaying apart.

8 Claims, 5 Drawing Sheets

(51) Int. Cl.
*B30B 9/30* (2006.01)
*A01F 15/14* (2006.01)

(56) References Cited

U.S. PATENT DOCUMENTS

| | | | |
|---|---|---|---|
| 2,902,922 | A | 9/1959 | Williams |
| 2,910,932 | A | 11/1959 | Wathen |
| 3,961,572 | A | 6/1976 | Johnston |
| 4,413,555 | A | 11/1983 | Swinney |
| 4,489,648 | A | 12/1984 | Naaktgeboren |
| 5,735,199 | A | 4/1998 | Esau et al. |
| 2002/0164101 | A1 | 11/2002 | Bass et al. |
| 2003/0024408 | A1 | 2/2003 | Viaud et al. |
| 2015/0334923 | A1* | 11/2015 | Verhaeghe .......... A01F 15/0825 56/341 |

FOREIGN PATENT DOCUMENTS

| | | |
|---|---|---|
| RU | 2063119 C1 | 7/1996 |
| WO | 2013017229 A1 | 2/2013 |

\* cited by examiner

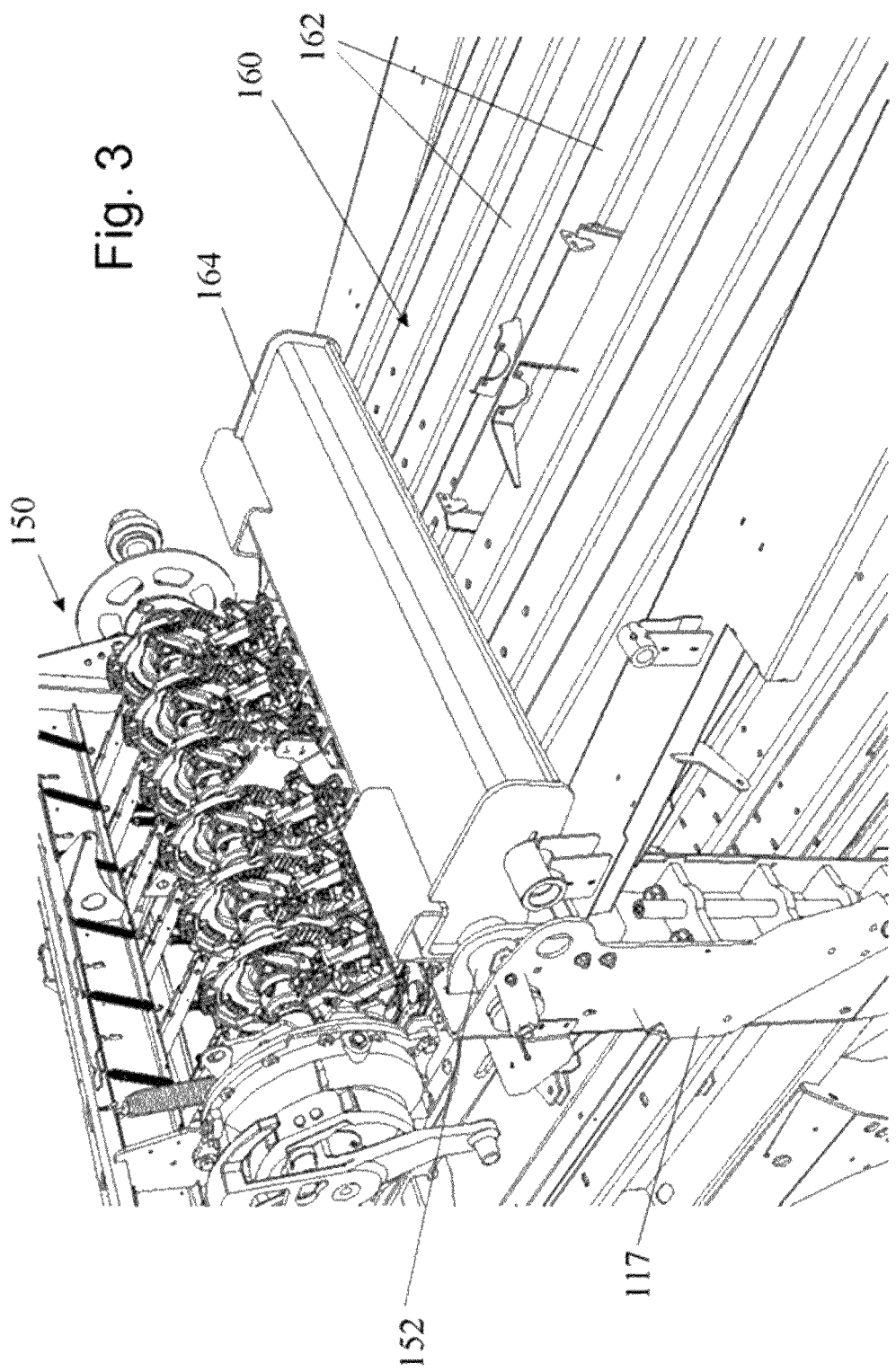

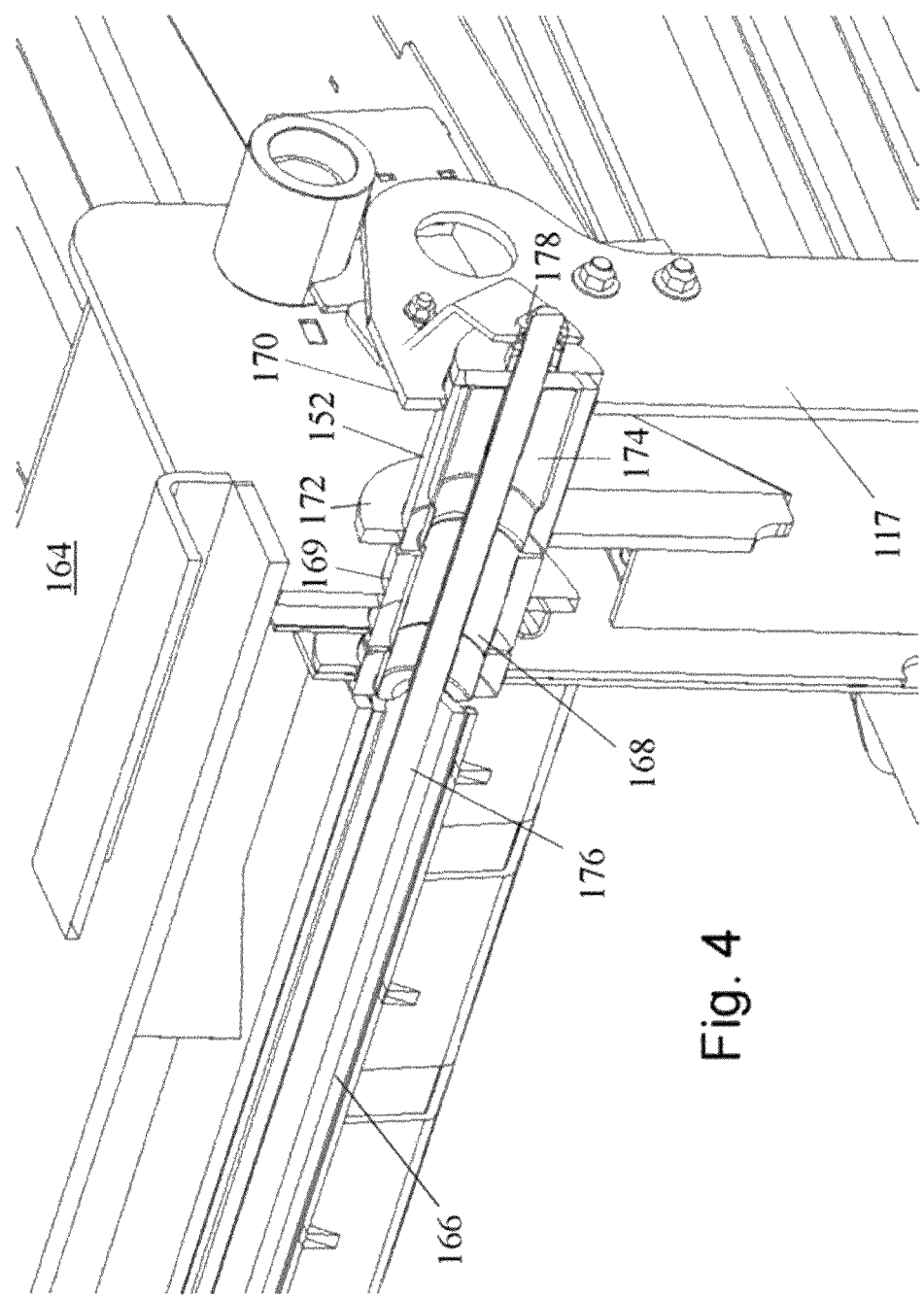

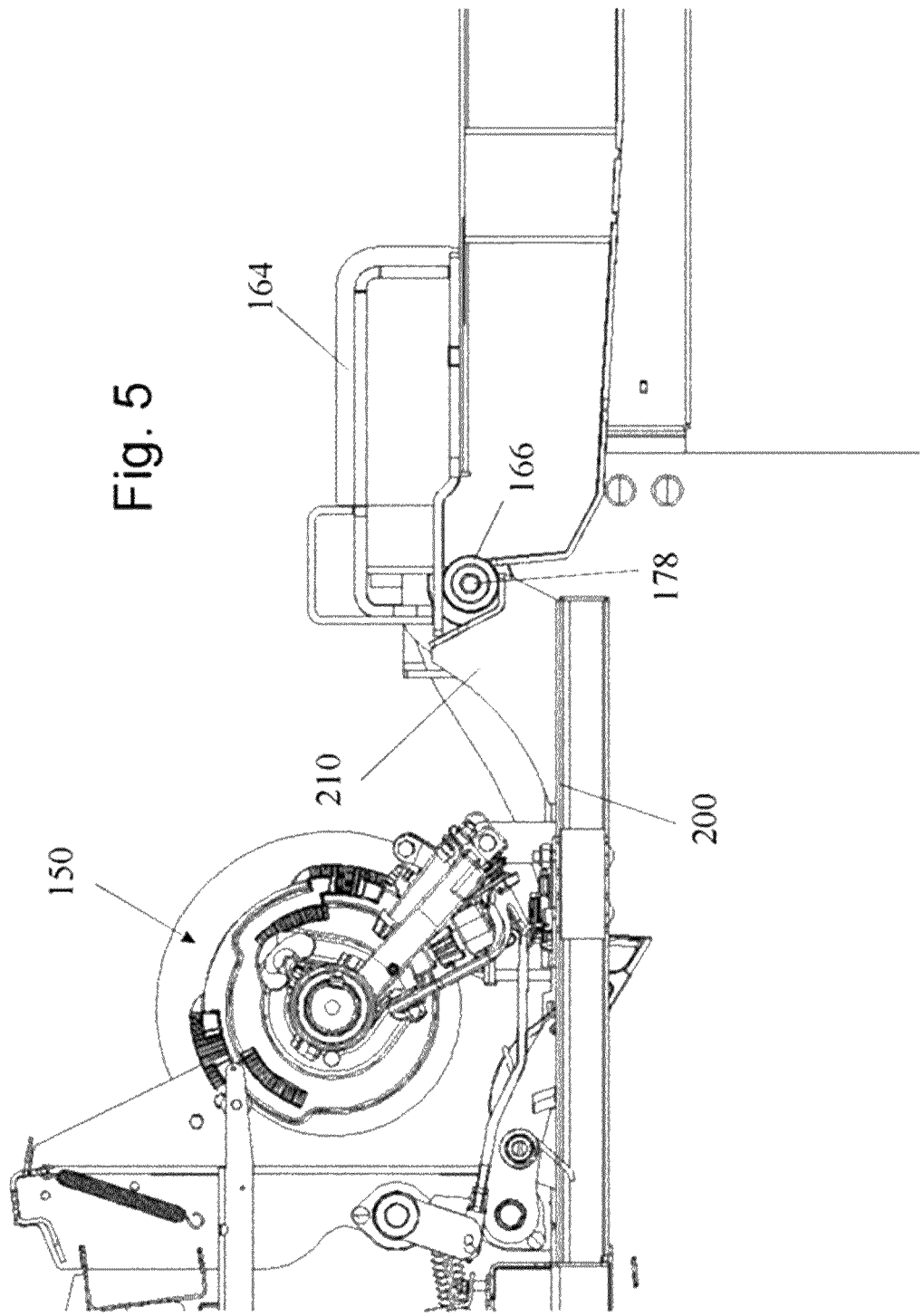

SQUARE BALERS

CROSS REFERENCE TO RELATED APPLICATION

This application is the National Stage of International Application No. PCT/EP2015/066816 filed Jul. 23, 2015, which claims priority to Belgium Patent Application No. 2014/0596 filed Aug. 1, 2014, the contents of which are incorporated herein by reference.

FIELD OF THE INVENTION

The present invention relates to a square baler.

BACKGROUND OF THE INVENTION

In a square baler, a plunger reciprocates within a bale case to compress slices of crop that are fed into a baling chamber through an opening in the floor of the bale case. After a bale has achieved a desired length, it is tied with twines that are knotted by an array of knotters mounted above the bale case. Pivoted arcuate needles pass through the baling chamber to bring twines from beneath the baling chamber up to the level of the knotters for tying around the completed bales.

To enable twines to be wrapped around the completed bales, at least the floor of the baling chamber is not made as a single continuous surface and is instead made up of separate spaced elongate members, herein termed profiles, the gaps between which allowing the twines and the needles to pass into the baling chamber. A similar construction using spaced profiles may also be used for the side walls and for the top wall of the baling chamber.

To allow the density of the bale to be modified, the top wall is often designed to be movable, this being achieved by including in the top wall a door that can pivot relative to the side walls of the baling chamber about a horizontal axis.

In order to maintain the integrity of the bale case, a support structure is required to hold the profiles in their desired relative positions and to prevent deformation of the bale case. A typical construction of a known bale case is shown in FIG. 1, which is a perspective view of a conventional bale case as seen from the rear end of the baler.

In FIG. 1, the floor 12 of the bale case 10 is formed of spaced profiles 13 that are secured at their rear end to a first frame 14 and at their front end to a second frame, which is termed the density belt 16. The rear frame 14 and the density belt 16 are each conventionally formed of rigid beams that are welded to one another at the corners. The two frames 14, 16 are connected to one another by longitudinally extending beams 18 and 20 to form a space frame on which side walls and a pivoted ceiling door (not shown) are mounted to define a rectangular or square baling chamber.

The top beam 16a of the density belt 16 serves several functions. First, it prevents the two upright beams 16b of the density belt 16 from splaying apart and for this it has withstand the compression forces applied to the crop by the reciprocating plunger. Second, the top beam 16a prevents the top wall of the baling chamber from bowing outwards. Third, the beam 16a provides a secure location for the pivot of the movable top door of the baling chamber.

The knotters also need to be securely mounted in relation to the bale case 10 and conventionally they are mounted on a separate beam located forward of the density belt 16. The top beam 16a of the density belt 16 in this case is required not to interfere with the removal of debris from the vicinity of the knotters.

Further, U.S. Pat. No. 5,735,199 shows a baler having a baling chamber formed by a pair of elongated top rails, bottom rails, side rails and a squeeze mechanism positioned proximate the discharge end of the bale chamber for symmetrically adjusting the cross-section size of the discharge opening. The squeeze mechanism includes a vertical squeeze assembly for adjusting the vertical distance between the top and bottom rails, and a horizontal squeeze assembly for adjusting the horizontal distance between the left and right side rails. Each squeeze assembly includes a jaw-type lever assembly surrounding its respective rails and a cylinder assembly that selectively shift its lever assembly and its respective rails towards and away from one another.

In U.S. Pat. No. 2,724,324 an automatic tension device for balers is shown, where the tension device is used to adjust the tension in the baling chamber to compensate for varying hay conditions such that the bales may be maintained a reasonable constant weight.

OBJECT OF THE INVENTION

On account of the severe stresses to which the density belt is subjected during use, it is known for the welds between the top beam 16a and the upright beams 16b of the density belt 16 to crack and a primary aim of the present invention is to mitigate this problem.

SUMMARY OF THE INVENTION

According to the present invention, there is provided a square baler comprising a baling chamber having a floor formed of spaced profiles, side walls and a top wall, and a density belt surrounding the baling chamber, characterised in that the density belt is formed of a U-shaped frame having three beams welded to one another to define a floor beam for supporting the floor of the baling chamber and two upright beams for supporting the side walls of the baling chamber and a tensioning rod releasably secured to the upper ends of the two upright beams to prevent the upright beams from splaying apart.

In the invention, the density belt has no top beam welded to the upright beams and in this way the risk of failure of the corner welds is avoided. Instead, the function of preventing the upright beams from splaying apart is performed by a separate tensioning rod that is not permanently attached to the upright beams.

The ends of the tensioning rod may be screw threaded and nuts may be fitted to the ends of the tensioning rod to secure the tensioning rod to the upright members.

Conveniently, the tensioning rod is pre-tensioned so as to apply a force drawing the free upper ends of the upright beams of the density belt towards one another.

In some embodiments of the invention, the baling chamber may have a movable top door pivotably mounted on the upper ends of the two upright beams.

Though not essential, the pivot axis of the top door may be coincident with the axis of the tensioning rod.

To help prevent the top wall of the baling chamber from bowing outwards, the top door may be provided at its forward end with a transversely extending reinforcement beam.

In some embodiments of the invention, the baler may further comprise knotters mounted on a plate that is prevented from bowing outwards by means of abutments positioned to engage beneath the reinforcement beam of the top door.

In such a construction, the abutments may be formed as transversely spaced upstanding brackets that define between them channels to allow debris blown away from the knotters to enter into the baling chamber.

BRIEF DESCRIPTION OF THE DRAWINGS

The invention will now be described further, by way of example, with reference to the accompanying drawings, in which:

FIG. 3 is a similar view to that of FIG. 3 with the tensioning rod and the pivotable top door in position, FIG. 4 is a schematic section through a vertical plane passing through the axis of the tensioning rod, and FIG. 5 is a schematic side view illustrating the engagement of the knotter assembly with a transverse reinforcement beam of top door of the baling chamber.

DETAILED DESCRIPTION OF THE DRAWINGS

Figure 1:
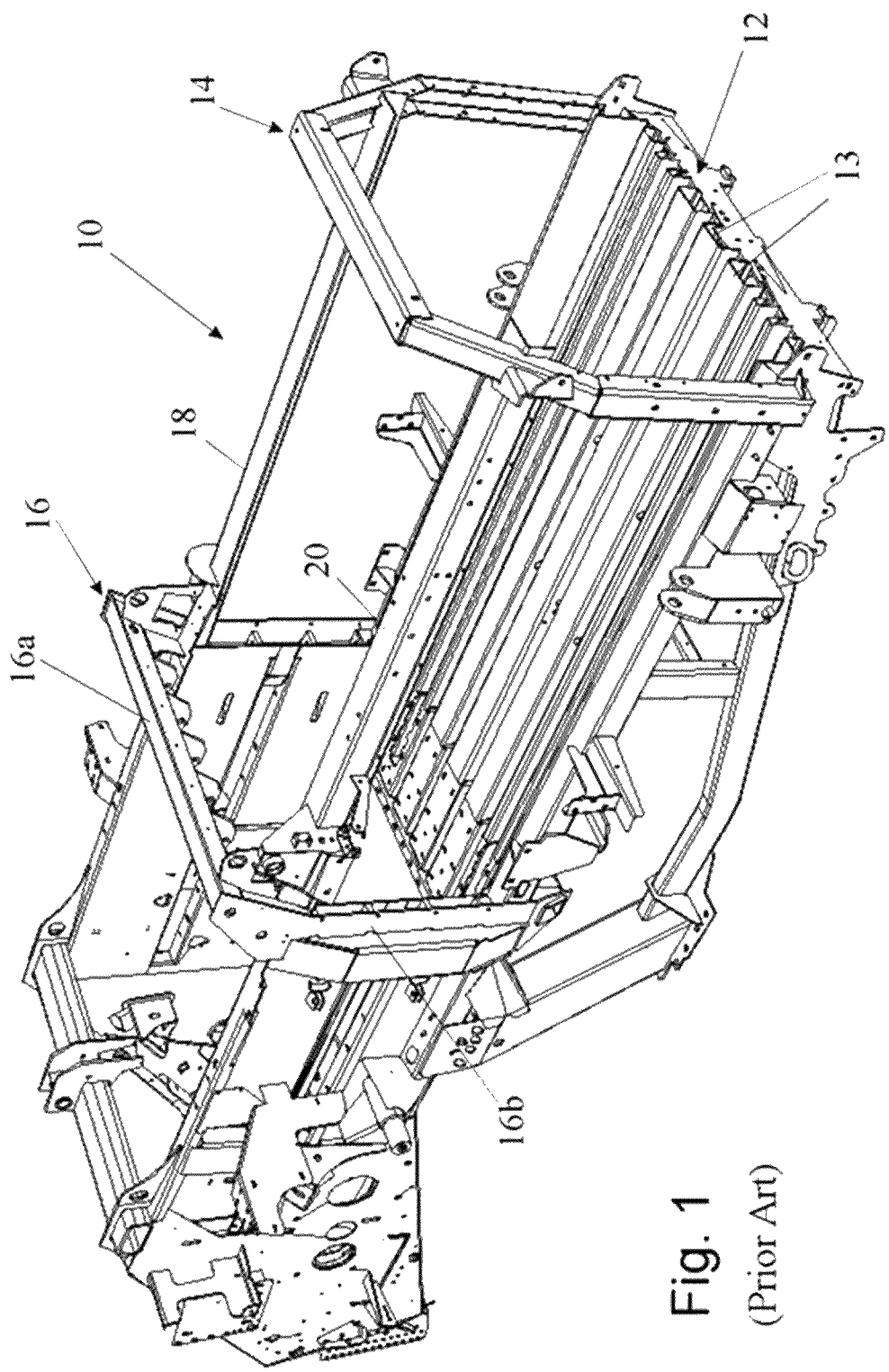
FIG. 1 is a rear view of a conventional bale case as described above.
Figure 2:
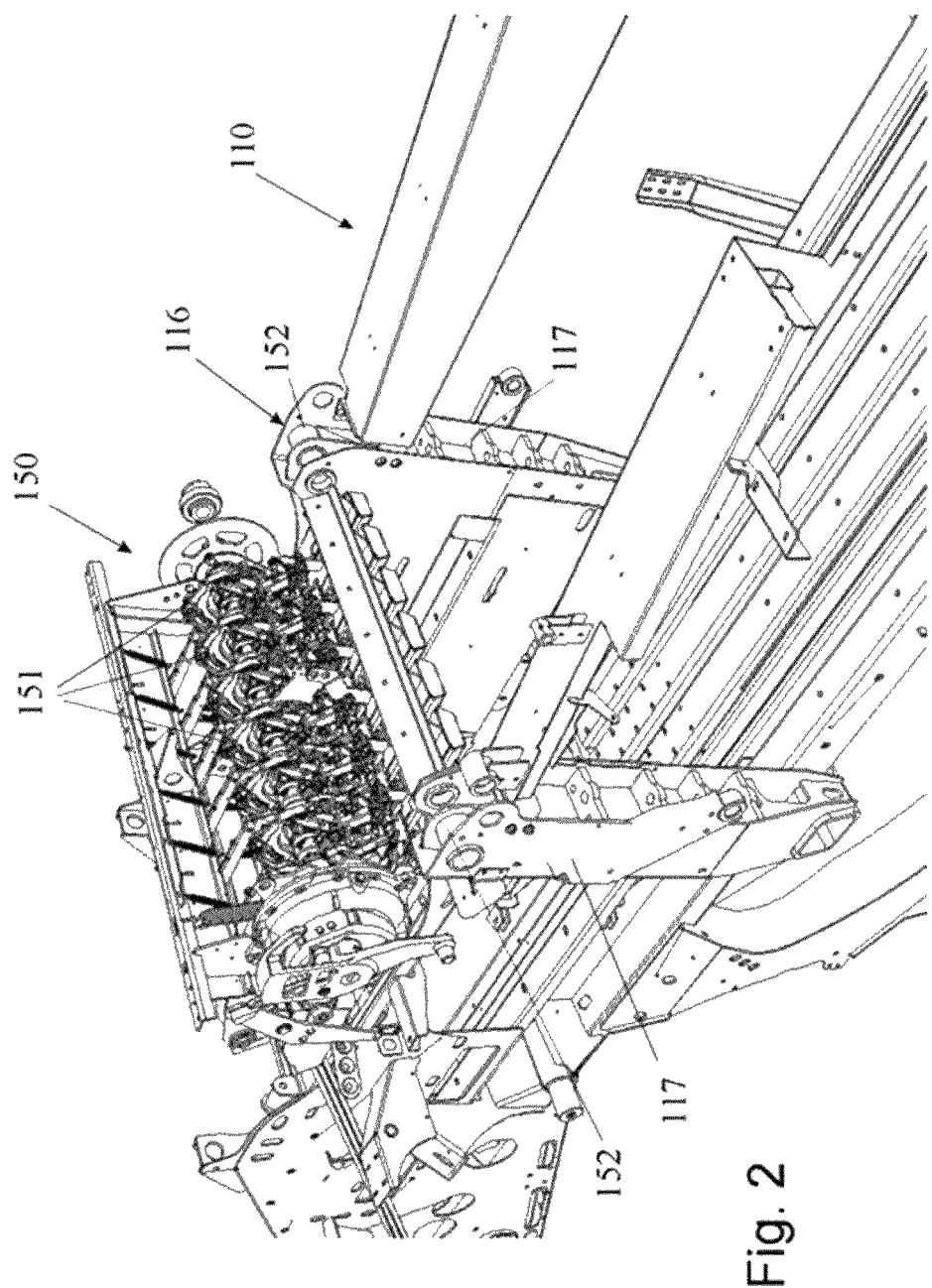
FIG. 2 is a partial rear view of a square baler of the invention with knotters fitted to the bale case but prior to the mounting of a tensioning rod on the density belt and to fitting of a pivotable top door.

The bale case 110 shown in FIG. 2 has a density belt 116 that comprises a U-shaped frame consisting of two lateral upright beams 117 and a horizontal beam (not seen in the drawing) that lies beneath the floor of the baling chamber. These three beams are permanently welded to one another. The density belt 116 lacks a welded top beam and the upper ends of the upright beams 117 are instead formed with bearing sleeves 152 for receiving a separate tensioning rod to be described below by reference to FIG. 4.

FIG. 2 also shows a knotter assembly 150 positioned atop the bale case forward of the density belt 116. The knotter assembly 150 comprises a plurality of transversely spaced knotters 151 supported on a common plate secured to the top wall of the baling chamber.

In FIG. 3, the same bale case 110 is shown with a pivotable top door 160 mounted in position to serve as a movable top wall of the baling chamber. The rear end of the top door 160 can be raised and lowered by means of hydraulic cylinders (not shown) for the purpose of varying the crop density. The top door 160 is formed of spaced profiles 162 which at their front end are welded to, and reinforced by, a transversely extending beam 164. As described in more detail below by reference to FIG. 4, the beam 164 is pivoted about the tensioning rod that passes through the bearing sleeves 152.

Referring now to FIG. 4, on each side of the bale case, the bearing sleeve 152 extends between two parallel vertical side walls 170 and 172 of the respective upright beam 117 of the density belt. A bearing bush 174 is mounted within the sleeve 152, the bush 174 having a central bore for receiving a tensioning rod 176 that extends transversely across the full width of the bale case. The tensioning rod 176 has threaded ends onto which nuts 178 are tightened to apply a force to the upright beams 117 of the density belt in a direction to draw the upright beams 117 towards one another and to withstand the forces of the compressed crop within the baling chamber that act to splay the upright beams of the density belt apart.

The forward facing end of the reinforcement beam 164 of the top door is formed with a tube 166 through which the tensioning rod 176 passes with clearance. Further bushes 168 are positioned in tubular sleeves projecting laterally from the top door 160 to act as pivots that allow the top door 160 to rotate about the axis of the tensioning rod 176.

In this way, the transverse reinforcement beam 164 of the top door 160 provides the desired resistance to bowing of the top wall of the baling chamber. However, as it is not welded to the uprights 117, any flexing of this door beam 164 does not risk cracking welds connecting it to the upright beams 117 of the density belt. If desired, the bushes 168 between the sleeves 169 and the tensioning rod 176 may be crowned to allow flexing of the door reinforcement beam 164 without applying torsional forces to the tensioning rod.

As best seen from FIG. 5, in the illustrated embodiment of the invention, the support plate 200 of the knotter assembly 150 has upstanding brackets 210 that engage beneath the tube 166 to prevent deformation of the knotter assembly 150 by the compressive forces acting on the crop. The brackets 210 are transversely spaced from one another so as to leave channels between them through which crop debris dislodged by blowers from the knotters may flow into the baling chamber.

It will be clear to persons skilled in the art that various modifications may be made to the illustrated embodiment of the invention without departing from the scope of the invention as set out in the appended claims. In particular, it is not essential for the top door of the baling chamber to be pivoted about the tensioning rod. It may instead be pivoted in further bearing sleeves provided in the upright beams of the upright beams of the density belt, similar for example to the bearing sleeves 152.

The invention claimed is:

1. A square baler comprising:
   a baling chamber comprising a floor formed of spaced profiles, side walls and a top wall, and a density belt surrounding the baling chamber,
   wherein the density belt comprises:
      a U-shaped frame comprising three beams welded to one another to define a floor beam for supporting the floor of the baling chamber and two upright beams for supporting the side walls of the baling chamber, the two upright beams each having an upper end, and
      a tensioning rod releasably secured to the upper ends of the two upright beams to prevent the upright beams from splaying apart, the tensioning rod having a first end and a second end.

2. The square baler of claim 1, wherein the ends of the tensioning rod are screw threaded, and wherein the density belt further comprises nuts fitted to the ends of the tensioning rod to secure the tensioning rod to the upright members.

3. The square baler of claim 2, wherein the tensioning rod is pre-tensioned so as to apply a force drawing the free upper ends of the upright beams of the density belt towards one another.

4. The square baler of claim 1, wherein the baling chamber further comprises a movable top door pivotably mounted on the upper ends of the two upright beams.

5. The square baler of claim 4, wherein a pivot axis of the top door is coincident with an axis of the tensioning rod.

6. The square baler of claim 4, wherein the top door comprises at its forward end a transversely extending reinforcement beam.

7. The square baler of claim 6, further comprising knotters mounted on a plate that is prevented from bowing outwards by abutments positioned to engage beneath the reinforcement beam of the top door.

8. The square baler of claim 7, wherein the abutments are formed as transversely spaced upstanding brackets that define between them channels to allow debris blown away from the knotters to enter into the baling chamber.

* * * * *